US012754574B2

(12) United States Patent
Matsumoto et al.

(10) Patent No.: US 12,754,574 B2
(45) Date of Patent: Oct. 6, 2026

(54) CONSTANT-TEMPERATURE LIQUID SUPPLY SYSTEM

(71) Applicant: DISCO CORPORATION, Tokyo (JP)

(72) Inventors: Tadaomi Matsumoto, Tokyo (JP); Masaru Saito, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 96 days.

(21) Appl. No.: 18/662,257

(22) Filed: May 13, 2024

(65) Prior Publication Data

US 2024/0385633 A1 Nov. 21, 2024

(30) Foreign Application Priority Data

May 19, 2023 (JP) ................................ 2023-083117

(51) Int. Cl.
*G05D 23/19* (2006.01)
*H05B 1/02* (2006.01)

(52) U.S. Cl.
CPC .......... *G05D 23/19* (2013.01); *H05B 1/0297* (2013.01)

(58) Field of Classification Search
CPC ............................. G05D 23/09; H05B 1/0297
See application file for complete search history.

(56) References Cited

U.S. PATENT DOCUMENTS

2021/0381783 A1* 12/2021 Matsumoto ............. F28F 27/02

FOREIGN PATENT DOCUMENTS

JP 3122494 U * 6/2006
JP 2019150901 A 9/2019
JP 2019196878 A * 11/2019

OTHER PUBLICATIONS

Sato et al., Temperature Control Device, Jun. 15, 2006, JP3122494U, Whole Document (Year: 2006).*
Kiyoshi, Fluid Heating Device, Nov. 14, 2019, JP2019196878A, Whole Document (Year: 2019).*

* cited by examiner

*Primary Examiner* — Larry L Furdge
(74) *Attorney, Agent, or Firm* — Greer Burns & Crain Ltd.

(57) ABSTRACT

A constant-temperature liquid supply system includes a communication path that allows communication between a liquid inlet and a liquid outlet and a heating unit arranged in the communication path. The heating unit includes a heater casing, a first heater that is attached to the casing and that has one or more heater portions, and a second heater that is detachably attachable to the casing and that has one or more heater portions. The casing has a space accommodating the heater portion or portions of the first heater, and also allowing accommodation of the heater portion or portions of the second heater.

5 Claims, 6 Drawing Sheets

CONSTANT-TEMPERATURE LIQUID SUPPLY SYSTEM

BACKGROUND OF THE INVENTION

Field of the Invention

The present invention relates to a constant-temperature liquid supply system for supplying liquid from a liquid supply source to a processing machine after controlling the liquid to a constant temperature.

Description of the Related Art

In a processing machine such as a grinding machine or a cutting machine, processing water, spindle cooling water, and the like are typically controlled at a constant temperature. Supplying the processing water, cooling water, and the like of the constant temperature prevents deterioration of processing accuracy due to thermal expansion and contraction of machine components and damage to the machine itself due to contact of components themselves such as spindle biting.

Conventionally, there are known constant-temperature water supply systems that keep, at a constant temperature, water to be supplied to processing machines (see, for example, Japanese Patent Laid-open No. 2019-150901).

The constant-temperature water supply system disclosed in Japanese Patent Laid-open No. 2019-150901 stores, in a tank, water which has been supplied from a factory facility or the like, controls the water to a constant temperature by temperature control means at an intermediate point along a flow path through which the water in the tank is to be supplied by a pump to a processing machine, and then supplies the water to the processing machine. The temperature control means is configured by a cooling unit and a heating unit.

The heating unit includes a heater that heats the water and a heater casing that accommodates the heater therein and that allows the water to flow therethrough. In general, a single heater is accommodated in one heater casing. If the capacity of the one heater is insufficient to satisfy a target specification as a heating capacity in the constant-temperature water supply system, a new heater casing with an additional heater accommodated therein is added to the heating unit.

SUMMARY OF THE INVENTION

When adding the new heater casing to the heating unit in the flow path, however, an additional space has to be provided for the arrangement of the new heater casing, leading to a problem that cumbersome labor for workers is needed for drainage work for water inside the flow path and additional arrangement of another flow path to connect the heater casings together upon the addition of the new heater casing.

Concerning constant-temperature liquid supply systems for supplying liquid at a constant temperature to a processing machine, there is hence an outstanding demand for the provision of a constant-temperature liquid supply system that allows easy addition of a heater as a heating unit.

The present invention therefore has as an object thereof the provision of a constant-temperature liquid supply system that allows easy addition of a heater.

In accordance with an aspect of the present invention, there is provided a constant-temperature liquid supply system for supplying liquid from a liquid supply source to a processing machine after controlling the liquid to a constant temperature. The constant-temperature liquid supply system includes a housing, an inlet disposed in the housing such that the liquid is allowed to flow from the liquid supply source into the housing, an outlet disposed in the housing such that the liquid is allowed flow out of the housing to the processing machine, a communication path enclosed in the housing, and communicating the inlet and the outlet, and a heating unit arranged in the communication path to heat the liquid to the constant temperature. The heating unit includes a heater casing, a first heater that is attached to the heater casing and that has at least one heater portion to heat the liquid, and a second heater that is detachably attachable to the heater casing and that has at least one heater portion to heat the liquid when the second heater is detachably attached to the heater casing. The heater casing has a space accommodating the at least one heater portion of the first heater, and when the second heater is detachably attached to the heater casing, also allowing accommodation of the at least one heater portion of the second heater. The second heater is allowed to be additionally detachably attached with ease to the heater casing when the first heater alone is insufficient to heat the liquid to the constant temperature.

Preferably, the heater casing may have a first end wall, a second end wall opposing the first end wall in a longitudinal direction of the heater casing, and a side wall, and define the space, the first heater may be attached to the first end wall, and the second heater is allowed to be detachably attached to the second end wall.

Preferably, the first end wall may be located lower than the second end wall.

Preferably, the heater casing may have an inlet opening for the liquid, the inlet opening being disposed in the side wall on a side of the first end wall, and an outlet opening for the liquid, the outlet opening being disposed in the side wall on a side of the second end wall.

Preferably, the constant-temperature liquid supply system may further include a thermometer disposed in the communication path on a downstream side of the heating unit to measure the temperature of the liquid.

The present invention exhibits an advantage that allows easy addition of a heater.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

With reference to the drawings, a description will be made in detail of an embodiment of the present invention and its modification. However, the present invention shall not be limited by details that will be described in the subsequent embodiment and modification. The elements of configurations that will hereinafter be described include those readily conceivable to persons skilled in the art and substantially the same ones. Further, the configurations that will hereinafter be described can be combined appropriately. Furthermore, various omissions, replacements, and modifications of configurations can be made without departing from the spirit of the present invention.

Figure 1:
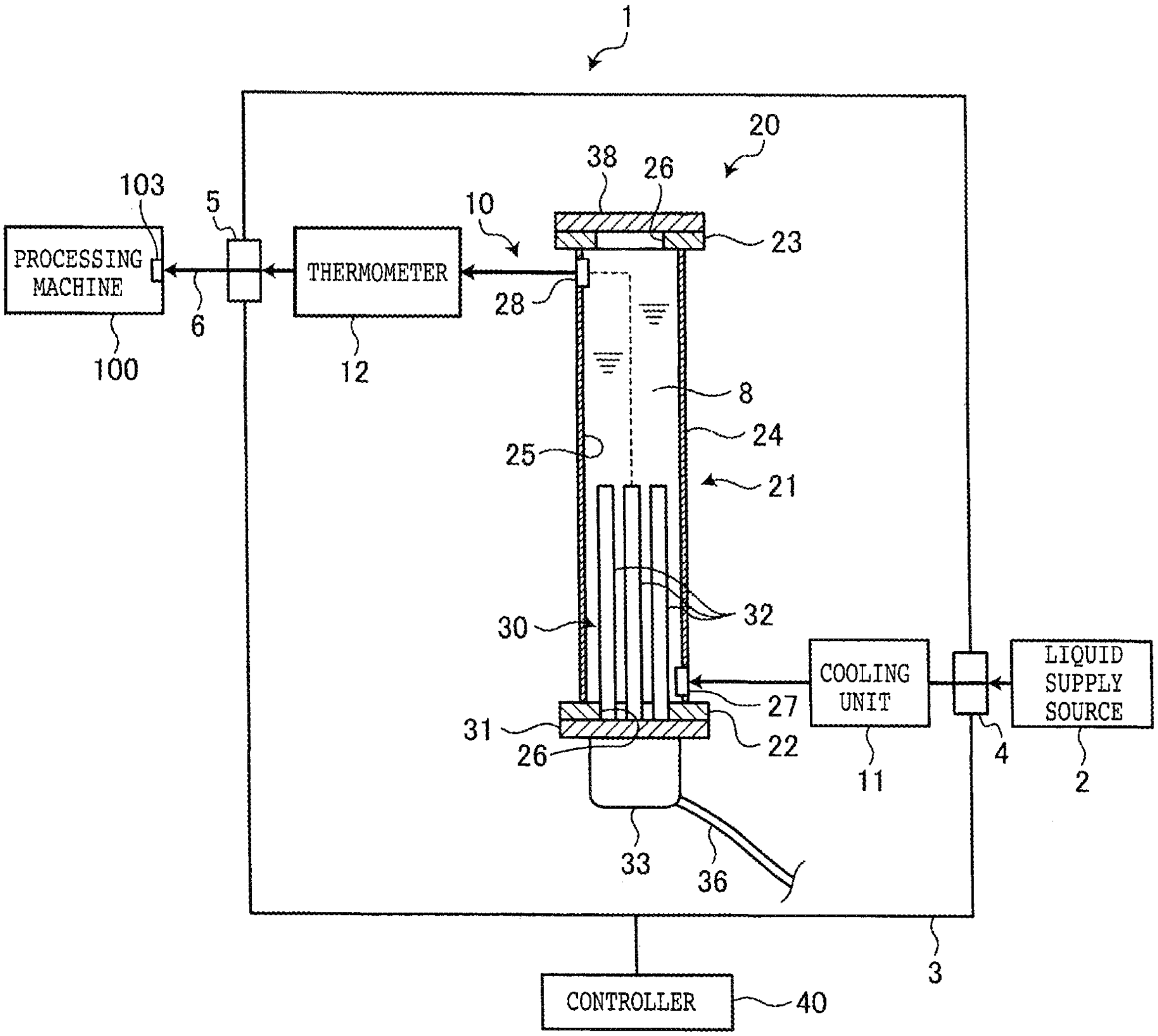
FIG. 1 is a block diagram schematically depicting a configuration example of a constant-temperature liquid supply system according to an embodiment of the present invention.
Figure 2:
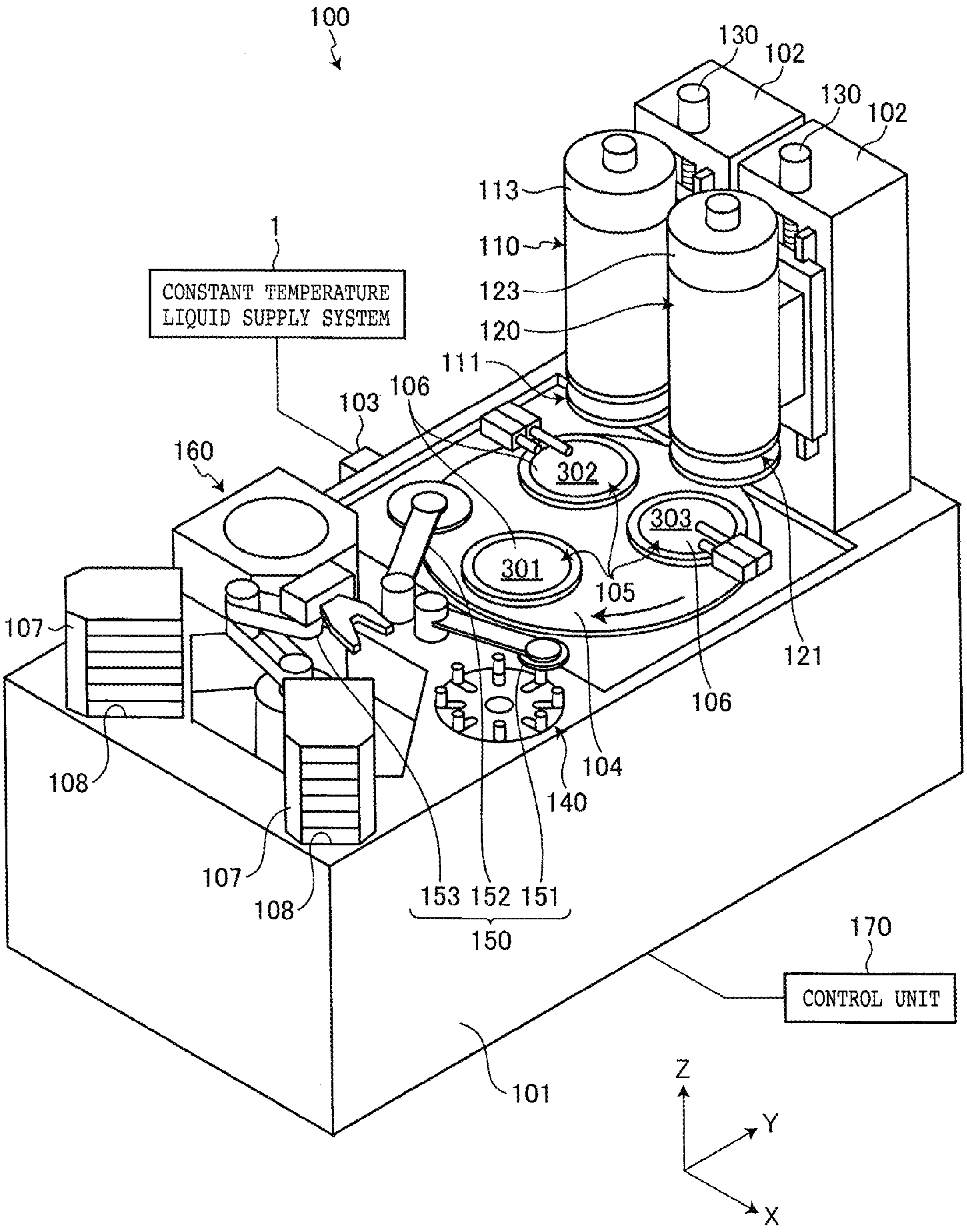
FIG. 2 is a perspective view schematically depicting a configuration example of a processing machine in which the constant-temperature liquid supply system depicted in FIG. 1 is used.

A constant-temperature liquid supply system 1 according to the embodiment of the present invention will be described in reference to FIGS. 1 through 5. FIG. 1 is a block diagram schematically depicting a configuration example of the constant-temperature liquid supply system 1 according to the embodiment. FIG. 2 is a perspective view schematically depicting a configuration example of a processing machine 100 in which the constant-temperature liquid supply system 1 depicted in FIG. 1 is used.

The constant-temperature liquid supply system 1 according to the embodiment as depicted in FIG. 1 supplies liquid 8 of a constant temperature to the processing machine 100 depicted in FIG. 2. The liquid 8 of the constant temperature which the constant-temperature liquid supply system 1 supplies is supplied to a workpiece and its processing element or elements when the processing machine 100 depicted in FIG. 2 processes the workpiece, is pure water in this embodiment, and is different from one that is used to cool a spindle and its sleeve and bearings. In this embodiment, the liquid 8 may be municipal water. The expression “the liquid 8 of the constant temperature” means liquid the temperature of which is equal to or higher than a predetermined lower limit temperature but equal to or lower than a predetermined upper limit temperature (which is a temperature higher than the lower limit temperature).

The processing machine 100 depicted in FIG. 2 is a grinding machine that subjects workpieces to grinding processing. The workpieces to be processed by the processing machine 100 depicted in FIG. 2 are wafers such as disk-shaped semiconductor wafers or optical device wafers using silicon, sapphire, gallium, or the like as substrates. Each workpiece includes undepicted devices formed in individual regions, which are defined by scribe lines set in a grid pattern on a front surface of the substrate.

These devices are, for example, integrated circuit devices such as general integrated circuits (ICs) or large-scale integration (LSI) circuits, image sensors such as charge coupled devices (CCDs) or complementary metal oxide semiconductors (CMOS), micro electro mechanical systems (MEMS), or semiconductor memories (storage devices).

In this embodiment, the workpiece is subjected to grinding processing by the processing machine 100 at its back surface on an opposite side of its front surface, and after thinned to a predetermined finish thickness, is divided into the individual device chips along the scribe lines.

As depicted in FIG. 2, the processing machine 100 includes a machine bed 101, a turn table 104, a plurality of (in this embodiment, three) holding tables 105 arranged on the turn table 104, a coarse grinding unit 110, a finish grinding unit 120, grinding feed units 130, cassettes 107, a positioning unit 140 as a support unit, a transfer unit 150, a rinsing unit 160, and a control unit 170.

The turn table 104 is a disk-shaped table disposed on an upper surface of the machine bed 101, is disposed rotatably in a horizontal plane about an axis of rotation parallel to a Z-axis direction, and is driven and rotated at a predetermined timing. Here, the Z-axis direction is a direction that is parallel to a vertical direction. On this turn table 104, the holding tables 105, for example, the three holding tables 105 are arranged at equal angular intervals of 120 degrees.

As depicted in FIG. 2, these three holding tables 105 are formed in a disk-shape, and their upper surfaces are holding surfaces 106 made from a porous material such as porous ceramic. Each holding table 105 is of a vacuum chuck table structure including a vacuum chuck in which the holding surface 106 is connected to an undepicted vacuum source. The workpiece is placed at its front surface on the holding surface 106, and the holding surface 106 is drawn by the suction source, whereby the workpiece is held under suction on the holding surface 106.

During grinding processing, each holding table 105 is driven and rotated by an undepicted rotating mechanism about an axis of rotation parallel to the Z-axis direction. The holding table 105 is sequentially moved to a loading/unloading area 301, a coarse grinding area 302, a finish grinding area 303, and the loading/unloading area 301 by rotation of the turn table 104.

The loading/unloading area 301 is an area where a workpiece is loaded on or unloaded from each holding table 105, the coarse grinding area 302 is an area where the workpiece held on the holding table 105 is subjected to coarse grinding processing (which is equivalent to grinding) by the coarse grinding unit 110, and the finish grinding area 303 is an area where the workpiece held on the holding table 105 is subjected to finish grinding processing (which is equivalent to grinding) by the fine grinding unit 120.

The coarse grinding unit 110 is a processing unit including a grinding wheel 111 for coarse grinding (which is equivalent to a processing tool) with grinding stones for coarse grinding arranged in an annular pattern thereon. This processing unit subjects the workpiece which is held on the holding surface 106 of the holding table 105 in the coarse grinding area 302, with its back surface exposed upwardly, to coarse grinding processing at its back surface. The fine grinding unit 120 is a processing unit including a grinding wheel 121 for fine grinding (which is equivalent to a processing tool) with grinding stones for fine grinding arranged in an annular pattern thereon. This processing unit subjects the workpiece, which is held on the holding surface 106 of the holding table 105 in the fine grinding area 303, with its back surface exposed upwardly, to finish grinding processing at its back surface.

In the grinding unit 110 or 120, the grinding wheel 111 or 121 is secured to a lower end (which is equivalent to a distal end) of a spindle that is rotated by a motor 113 or 123 about an axis of rotation parallel to the Z-axis direction, and the grinding stones of the grinding wheel 111 or 121 are arranged opposite to the holding surface 106 of the holding table 105 positioned in the coarse grinding area 302 or the finish grinding area 303. While the spindle and the grinding wheel 111 or 121 are rotated about the axis of rotation by the motor 113 or 123 and the liquid 8 which has been supplied from the constant-temperature liquid supply system 1 is supplied to the back surface of the workpiece held on the holding table 105 in the coarse grinding area 302 or the fine grinding area 303, the grinding stones of the grinding wheel 111 or 121 are brought closer to the holding table 105 at a predetermined feed rate by the associated grinding feed unit 130. The grinding unit 110 or 120 subjects the workpiece to coarse grinding or finish grinding at its back surface.

Each grinding feed unit 130 moves the associated grinding unit 110 or 120 in the Z-axis direction, such that the associated grinding unit 110 or 120 and the holding table 105 which is positioned in the associated one of the coarse grinding area 302 and the finish grinding area 303 are moved relatively toward or away each other. In this embodiment, each grinding feed unit 130 is disposed on a corresponding upright column 102 that is disposed upright from an end portion in a Y-axis direction, which is parallel to a horizontal direction, of the machine bed 101. Each grinding feed unit 130 includes a known ball screw disposed rotatably about an axis of rotation, a known motor for rotating the ball screw about the axis of rotation, and a known pair of guide rails supporting a spindle housing of the associated grinding unit 110 or 120 movably in the Z-axis direction.

In this embodiment, the coarse grinding unit 110 is configured such that the axis of rotation, as a rotation center, of the grinding wheel 111 and the axis of rotation, as a rotation center, of the holding table 105 positioned in the coarse grinding area 302 are arranged parallel to each other with an interval left in the horizontal direction therebetween, and the grinding stones for coarse grinding pass on a center of the back surface of the workpiece held on the holding table 105. The finish grinding unit 120 is also configured similar to the coarse grinding unit 110.

The cassettes 107 are holder cases, each of which has a plurality of slots to hold a plurality of workpieces therein. One of the cassettes 107 holds the workpieces that have not yet been subjected to grinding processing, while the other cassette 107 holds the workpieces that have been subjected to grinding processing. In this embodiment, these cassettes 107 are arranged in a pair, and are disposed on cassette mount tables 108, respectively. The positioning unit 140 is a table, where each workpiece individually taken out of the cassette 107 in which the workpieces are held before being subjected to grinding processing is temporarily held for its centering.

The transfer unit 150 serves to transfer the workpieces. The transfer unit 150 includes a loading unit 151, an unloading unit 152, and a loading/unloading unit 153.

The loading unit 151 has at a distal end portion thereof a suction pad that holds each workpiece by suction, and is formed in the shape of an arm that is disposed pivotally about a proximal end portion thereof on the machine bed 101. The loading unit 151 holds each workpiece which has not yet been subjected to grinding processing but has been subjected to centering by the positioning unit 140, under suction on the suction pad, and loads it onto the holding table 105 positioned in the loading/unloading area 301.

The unloading unit 152 has at a distal end portion thereof a suction pad that holds each workpiece by suction, and is formed in the shape of an arm that is disposed pivotally about a proximal end portion thereof on the machine bed 101. The unloading unit 152 holds each workpiece which has been subjected to grinding processing and which is on the holding table 105 positioned in the loading/unloading area 301, under suction on the suction pad, and unloads it to the rinsing unit 160.

The loading/unloading unit 153 individually takes each workpiece out of the cassette 107 in which the workpieces which have not yet been subjected to grinding processing are held, and transfers it to the positioning unit 140. The loading/unloading unit 153 also takes each workpiece which has been subjected to grinding processing out of the rinsing unit 160, and transfers it into the cassette 107 that holds workpieces that have been subjected to grinding processing. The loading/unloading unit 153 is a pick and place robot provided with, for example, a U-shaped hand, and with the U-shaped hand, holds the workpiece under suction and transfers it.

The rinsing unit 160 rinses each workpiece which has been subjected to grinding processing to remove contaminants such as grinding debris stuck on the ground back surface.

The control unit 170 serves to control the above-mentioned individual constituent units, which make up the processing machine 100, separately or in combination. Described specifically, the control unit 170 controls operations of at least the holding tables 105 and the grinding units 110 and 120 to make the processing machine 100 perform processing operations on the workpieces. The control unit 170 is a computer including a computation processing unit having a microprocessor such as a central processing unit (CPU), a storage device having a memory such as a read only memory (ROM) or a random access memory (RAM), and an input/output interface device.

The computation processing unit of the control unit 170 performs computation processing in accordance with a computer program stored in the storage device, and outputs control signals to the above-mentioned constituent units of the processing machine 100 via the input/output interface devices to control the processing machine 100. The control unit 170 is also connected to a display unit, an input unit, and a notification unit. The display unit is configured by a liquid crystal display or the like, which displays conditions, images, and the like of processing operations. The input unit is used when an operator records information on processing details and the like. The notification unit makes notifications to the operator.

The input unit is configured by at least one of a touch panel included in the display unit, a keyboard, and the like. The notification unit produces at least one of a sound, a light, and a message on the touch panel to give notification to the operator.

In this embodiment, the processing machine 100 also includes an on/off valve 103 disposed in a supply port through which the liquid 8 is supplied from the constant-temperature liquid supply system 1. When subjecting each workpiece to grinding processing, the on/off valve 103 is opened, and the liquid 8 is supplied from the constant-temperature liquid supply system 1 to the processing machine 100, and during grinding processing, the liquid 8 so supplied is supplied to the back surface of the workpiece held on the holding table 105 in the grinding area 302 or 303. When stopping the grinding processing of the workpiece, the on/off valve 103 is closed, and the supply of the liquid 8 from the constant-temperature liquid supply system 1 to the processing machine 100 is stopped.

When the cassette 107 with a plurality of workpieces that have not yet been subjected to grinding processing and held therein with the back surfaces thereof directed upward is placed on the corresponding cassette mount table 108 on the machine bed 101 by the operator, processing conditions are recorded in the control unit 170 by the operator, and the control unit 170 receives instructions for start of a processing operation from the operator, the processing machine 100 starts the processing operation in this embodiment. In the processing operation, the spindle of each grinding unit 110 or 120 is rotated about its axis of rotation at a rotational speed set under the processing conditions, a desired one workpiece is taken out of the cassette 107 in which the workpieces that have not yet been subjected to grinding processing are held, and is transferred to the positioning unit 140 by the loading/unloading unit 153, the centering of the workpiece is performed by the positioning unit 140, and the workpiece is supported and transferred by the loading unit 151 onto the holding surface 106 of the holding table 105 positioned in the loading/unloading area 301.

In the processing operation, the workpiece is held by suction on the holding surface 106 of the holding table 105 in the loading/unloading area 301, the turn table 104 is rotated, and the holding table 105 with the workpiece held thereon in the loading/unloading area 301 is moved sequentially to the coarse grinding area 302 and the finish grinding area 303. By the liquid 8 being supplied while the holding table 105 is being rotated about its axis of rotation, the workpiece is subjected to grinding processing sequentially by the coarse grinding unit 110 and the finish grinding unit 120. After the workpiece has been subjected to finish grinding processing, the turn table 104 is rotated, the holding table 105 with the workpiece that has been subjected to finish grinding processing held thereon is moved to the loading/unloading area 301, the workpiece that has been subjected to finish grinding processing is transferred from the holding table 105 in the loading/unloading area 301 to the rinsing unit 160 by the unloading unit 152, and after being rinsed by the rinsing unit 160, the workpiece is placed by the loading/unloading unit 153 in the cassette 107 that holds workpieces that have been subjected to grinding processing.

In the above-described processing operation, every time the turn table 104 is rotated by 120 degrees, the workpiece that has been subjected to finish grinding processing is transferred from the holding table 105, on which the workpiece had been held, in the loading/unloading area 301 to the rinsing unit 160, the workpiece that has not yet been subjected to grinding processing is transferred onto the holding table 105 on which the workpiece that has been subjected to finish grinding processing is no longer held, in the loading/unloading area 301, the workpiece that has not yet been subjected to grinding processing held on the holding table 105 in the coarse grinding area 302 is subjected to coarse grinding processing, and the workpiece that has been subjected to coarse grinding processing and that is held on the holding table 105 in the finish grinding area 303 is subjected to finish grinding processing. In this manner, every time the turn table 104 is rotated by 120 degrees, the workpiece that has been subjected to finish grinding processing is unloaded from the holding table 105 in the loading/unloading area 301, the workpiece that has not yet been subjected to grinding processing is loaded onto the holding table 105 in the loading/unloading area 301, and the workpiece that has not yet been subjected to grinding processing held on the holding surface 106 of the holding table 105 is positioned sequentially in the coarse grinding area 302 and the finish grinding area 303, and is subjected sequentially to coarse grinding processing and finish grinding processing. When coarse grinding processing and finish grinding processing are applied to all the workpieces in the cassette 107 in which the workpieces that have not yet been subjected to grinding processing have been held, the processing operation is ended.

Figure 3:
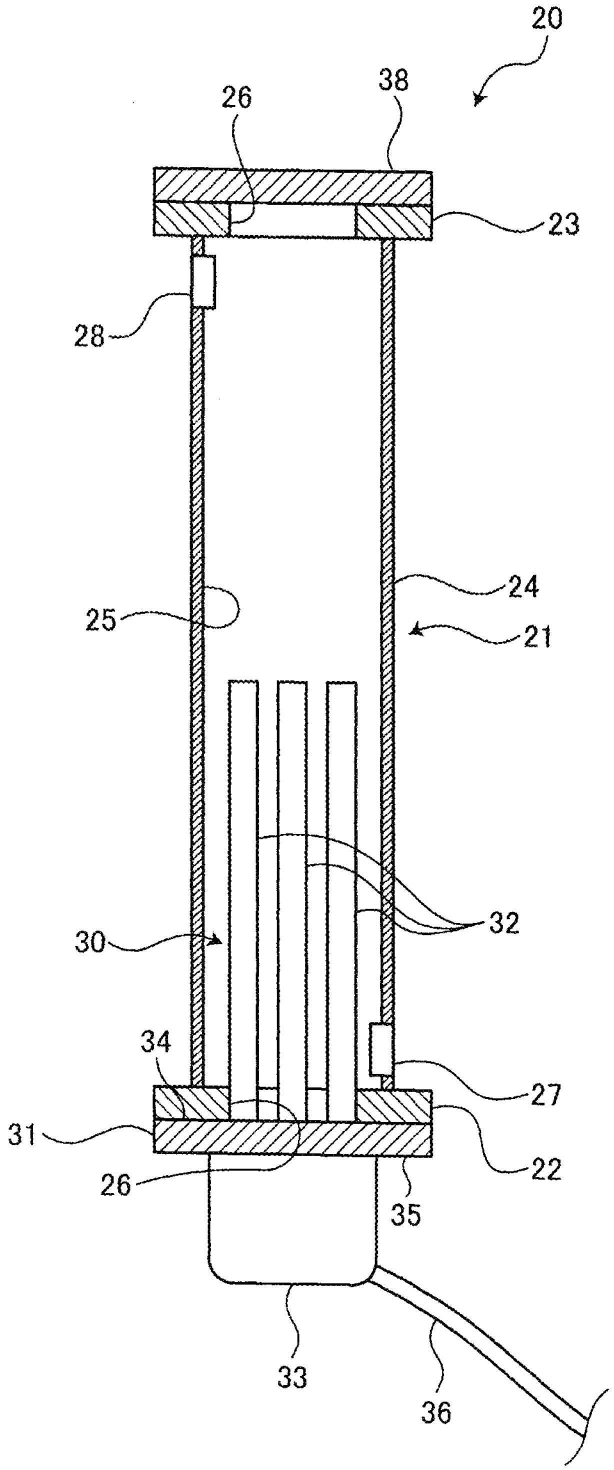
FIG. 3 is a side view schematically depicting, partly in section, the configuration of a heating unit of the constant-temperature liquid supply system depicted in FIG. 1.
Figure 4:
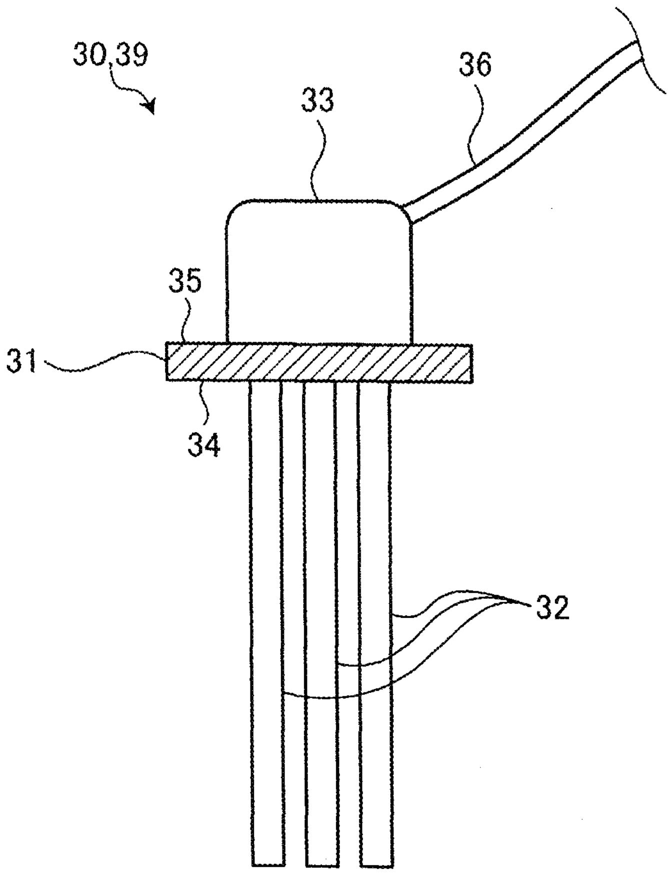
FIG. 4 is a side view schematically depicting, partly in section, the configuration of a first heater or a second heater of the heating unit depicted in FIG. 3.
Figure 5:
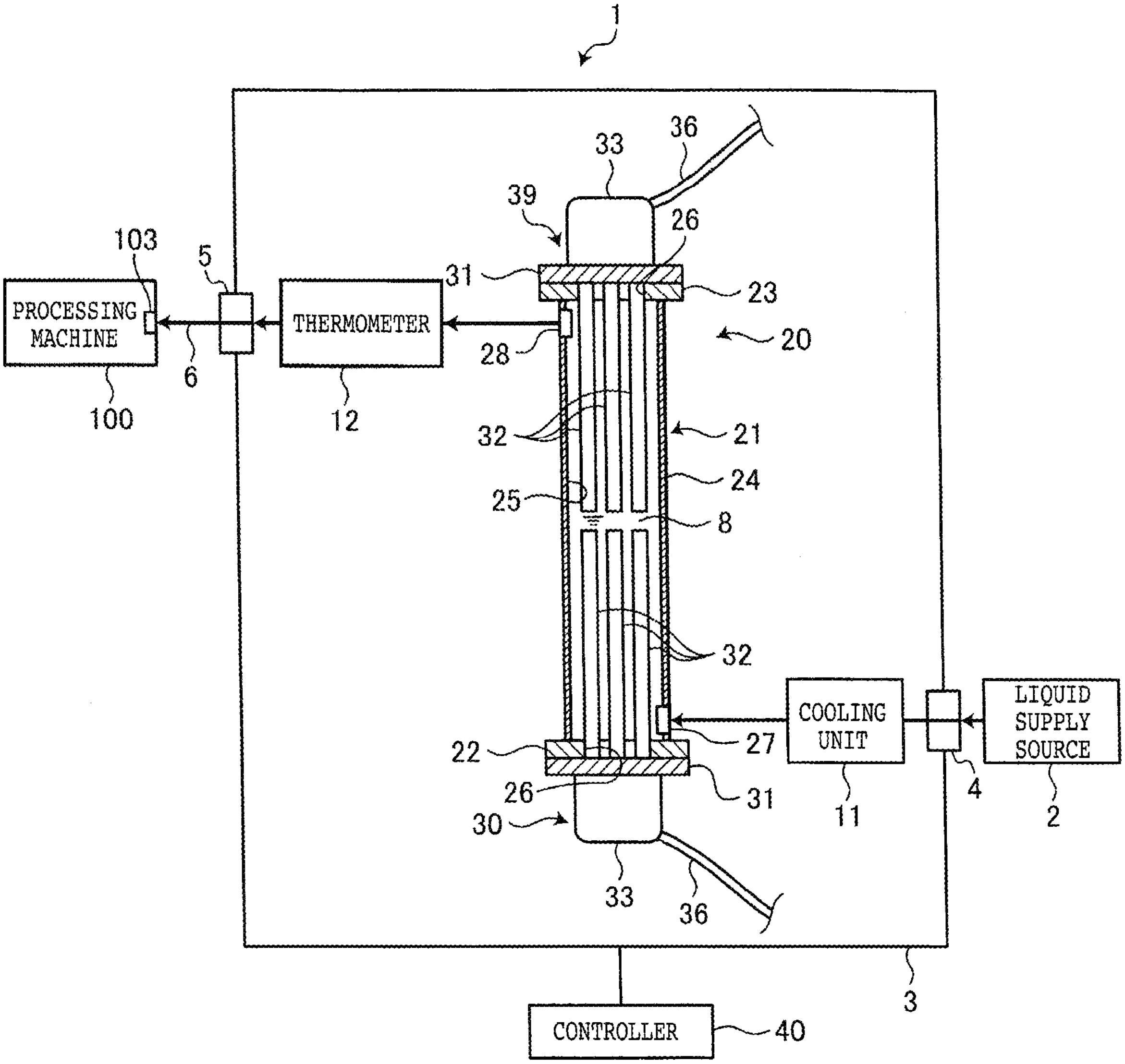
FIG. 5 is a block diagram schematically depicting the heating unit of the constant-temperature liquid supply system depicted in FIG. 1, to which the first heater and the second heater have been attached.

A description will next be made of the constant-temperature liquid supply system 1. FIG. 3 is a side view schematically depicting, partly in section, the configuration of a heating unit 20 of the constant-temperature liquid supply system 1 depicted in FIG. 1. FIG. 4 is a side view schematically depicting, partly in section, the configuration of each of a first heater 30 or a second heater 39 of the heating unit 20 depicted in FIG. 3. FIG. 5 is a block diagram schematically depicting the heating unit 20 of the constant-temperature liquid supply system 1 depicted in FIG. 1, to which the first heater 30 and the second heater 39 have been attached.

The constant-temperature liquid supply system 1 supplies the liquid 8 from a liquid supply source 2 depicted in FIG. 1 to the processing machine 100 after controlling the liquid 8 to the above-mentioned constant temperature. As depicted in FIG. 1, the constant-temperature liquid supply system 1 includes a housing 3, an inlet 4 disposed in the housing 3, an outlet 5 disposed in the housing 3, a communication path 10 enclosed in the housing 3, a cooling unit 11 enclosed in the housing 3, the heating unit 20 enclosed in the housing 3, a thermometer 12, and a controller 40.

The inlet 4 serves to allow the liquid 8 to flow from the liquid supply source 2 into the housing 3. The outlet 5 allows the liquid 8 to flow out of the housing 3 to the processing machine 100. The outlet 5 is connected with the on/off valve 103 of the processing machine 100 through a pipe 6.

The communication path 10 is piping that allows communication between the inlet 4 and the outlet 5 with each other. The communication path 10 serves to guide the liquid 8 from the inlet 4 to the outlet 5. The cooling unit 11 is arranged in the communication path 10, and serves to cool the liquid 8 flowing through the communication path 10. The cooling unit 11 cools the liquid 8 which is flowing through the communication path 10, when operated, but does not cool the liquid 8 which is flowing through the communication path 10, when stopped. In this embodiment, the cooling unit 11 is a known chiller.

The heating unit 20 is disposed in the communication path 10, and serves to heat the liquid 8 flowing through the communication path 10, such that the temperature of the liquid 8 is controlled. In this embodiment, the heating unit 20 is arranged on a downstream side of the cooling unit 11 in a flowing direction of the liquid 8 flowing through the communication path 10.

As depicted in FIG. 3, the heating unit 20 has a heater casing 21, the first heater 30, and a lid body 38. The heater casing 21 includes a first end wall 22, a second end wall 23 opposing the first end wall 22 with an interval in a longitudinal direction of the heater casing 21 to the first end wall 22, and a side wall 24 extending to the first end wall 22 and the second end wall 23, and internally defines a space 25 that stores the liquid 8 therein and allows the liquid 8 to flow therethrough. The heater casing 21 hence has the space 25. In this embodiment, the heater casing 21 is provided at one end portion of the side wall 24 with the first end wall 22, and is provided at the other end portion of the side wall 24 with the second end wall 23.

In this embodiment, the first end wall 22 and the second end wall 23 are each formed in an annular form, so that a through-hole 26 is centrally formed. The first end wall 22 is located lower than the second end wall 23. The side wall 24 extends to sides of outer peripheries of the through-holes 26 of the first end wall 22 and the second end wall 23, and is formed in a cylindrical shape. Outer edges of the first and second end walls 22 and 23 protrude outward in a radial direction from an outer circumference of the side wall 24.

The heater casing 21 also has an inlet opening 27 for the liquid 8 and an outlet opening 28 for the liquid 8. The inlet opening 27 extends through the side wall 24, and is disposed on a side closer to the first end wall 22 than a center in the longitudinal direction of the side wall 24. The inlet opening 27 allows the liquid 8 to flow from the liquid supply source 2 into the heater casing 21 through the communication path 10, the cooling unit 11, and the like. The outlet opening 28 extends through the side wall 24, and is disposed on a side closer to the second end wall 23 than the center in the longitudinal direction of the side wall 24. The outlet opening 28 allows the liquid 8 to flow out of the heater casing 21.

The first heater 30 is attached to the heater casing 21, and heats the liquid 8 in the heater casing 21. As depicted in FIGS. 3 and 4, the first heater 30 includes a flange 31, a plurality of heater portions 32, and a heater cap 33. The flange 31 is formed in a disk shape of the same diameter as the outer diameter of the first and second end walls 22 and 23.

In this embodiment, the heater portions 32 are disposed upright from one surface 34 of the flange 31. The heater portions 32 are what are generally called sheathed heaters, each of which encloses, in a pipe made of stainless steel or the like, a spiral heating element that generates heat when electric power is applied, and is filled with an insulating material having thermal conductivity. The heater portions 32 are disposed upright from one surface 34 of the flange 31, and have an overall length shorter than half the overall length of the heater casing 21.

The heater cap 33 is formed in a dome shape, and is disposed on the other surface 35 of the flange 31. The heater cap 33 is provided with an undepicted hole through which a cable 36 passes to supply electric power to the heater portions 32.

The heater portions 32 of the first heater 30 are inserted into the space 25 of the heater casing 21 through the through-hole 26 in the first end wall 22, and are arranged in the space 25 of the heater casing 21. The first heater 30 is attached to the heater casing 21 with the one surface 34 of the flange 31 laid on the first end wall 22. In this embodiment, the first heater 30 is attached to the heater casing 21 by the flange 31 being connected to the first end wall 22, for example, with undepicted bolts and nuts or the like. As appreciated from the foregoing, the first heater 30 is detachably attached to the first end wall 22 with the bolts and nuts or the like.

The lid body 38 is attached to the heater casing 21 to hermetically close the space 25 in the heater casing 21. The lid body 38 is formed in a disk shape of the same outer diameter as the outer diameter of the end walls 22 and 23. The lid body 38 is laid on the second end wall 23, and attached to the heater casing 21. In this embodiment, the lid body 38 is connected to the second end wall 23, for example, by undepicted bolts and nuts or the like, and hence is attached to the heater casing 21.

In the heating unit 20, the first heater 30 is arranged connected to the first end wall 22 of the heater casing 21, the lid body 38 is arranged connected to the second end wall 23 of the heater casing 21, and the heater portions 32 of the first heater 30 are accommodated in the space 25. When electric power is applied to the heater portions 32 via the cable 36, the heating unit 20 heats the liquid 8 flowed into the heater casing 21 through the inlet opening 27, and allows it to flow out of the heater casing 21 through the outlet opening 28. When no electric power is applied to the heater portions 32 via the cable 36, the heating unit 20 allows the liquid 8 which has flowed into the heater casing 21 through the inlet opening 27 to flow out of the heater casing 21 through the outlet opening 28 without being heated. The cooling unit 11 and the heating unit 20, in cooperation, control the liquid 8 which is flowing through the communication path 10 to the above-mentioned constant temperature. In this embodiment, the maximum output power of the first heater 30 is 6 W.

The thermometer 12 is arranged in the communication path 10, and serves to measure the temperature of the liquid 8 flowing through the communication path 10 and to output the measurement results to the controller 40. In this embodiment, the thermometer 12 is arranged on a downstream side of the heating unit 20 in the flowing direction of the liquid 8 flowing through the communication path 10.

The controller 40 serves to control the above-mentioned individual constituent units which make up the constant-temperature liquid supply system 1, separately or in combination. Described specifically, the controller 40 controls operations of at least the cooling unit 11 and the heating unit 20 to make the constant-temperature liquid supply system 1 perform an operation to supply the liquid 8 to the processing machine 100.

The controller 40 is a computer including a computation processing unit having a microprocessor such as a CPU, a storage device having a memory such as a ROM or a RAM, and an input/output interface device. The computation processing unit of the controller 40 performs computation processing in accordance with a computer program stored in the storage device, and outputs control signals to the above-mentioned constituent units of the constant-temperature liquid supply system 1 via the input/output interface devices to control the constant-temperature liquid supply system 1.

In this embodiment, the heating unit 20 allows additional arrangement of the second heater 39 as depicted in FIG. 5. As the second heater 39 has the same configuration as that of the first heater 30, portions of the second heater 39, the portions being the same as the corresponding portions of the first heater 30, are identified by the same reference numerals, and their description is omitted.

After the lid body 38 has been detached from the second end wall 23 of the heater casing 21, heater portions 32 of the second heater 39 are inserted into the space 25 of the heater casing 21 through the through-hole 26 in the second end wall 23, and are arranged in the space 25 of the heater casing 21. The second heater 39 is attached to the heater casing 21 with the one surface 34 of a flange 31 laid on the second end wall 23. In this embodiment, the second heater 39 is attached to the heater casing 21 by the flange 31 being connected to the second end wall 23, for example, with undepicted bolts and nuts or the like. As appreciated from the foregoing, the second heater 39 is detachably attached to the second end wall 23 with the bolts and nuts or the like.

Similarly to the first heater 30, the second heater 39 is arranged connected to the second end wall 23 of the heater casing 21, and the heater portions 32 of the second heater 39 are accommodated in the space 25. The heater casing 21 thus has the space 25 accommodating the heater portions 32 of the first heater 30, and when the second heater 39 is detachably attached to the heater casing 21, also allowing detachable accommodation of the heater portions 32 of the second heater 39. Further, the heater portions 32 of the second heater 39 oppose the heater portions 32, which are enclosed in the space 25, of the first heater 30, with an interval left therebetween in the longitudinal direction of the heater casing 21.

When electric power is applied to the heater portions 32 of the second heater 39 via a cable 36, the liquid 8 flowed into the heater casing 21 through the inlet opening 27 is additionally heated, and is allowed to flow out of the heater casing 21 through the outlet opening 28. When no electric power is applied to the heater portions 32 of the second heater 39 via the cable 36, the liquid 8 flowed into the heater casing 21 through the inlet opening 27 is allowed to flow out of the heater casing 21 through the outlet opening 28 without being additionally heated. In this embodiment, the maximum output power of the second heater 39 is 6 W.

If the first heater 30 alone is insufficient to heat the liquid 8 to the above-mentioned constant temperature (in other words, the liquid 8 cannot be heated to the above-mentioned constant temperature) in the heating unit 20, the second heater 39 can be additionally detachably attached with ease to the heater casing 21 with the above-mentioned bolts and nuts or the like by the lid body 38 being detached from the heater casing 21 and the heater portions 32 of the second heater 39 being inserted into the space 25.

In the constant-temperature liquid supply system 1 of the above-mentioned configuration, at least the first heater 30 is attached to the heater casing 21 of the heating unit 20 as depicted in FIG. 1, and depending on the temperature to which the liquid 8 is to be heated, the second heater 39 is additionally attached as depicted in FIG. 5. In the constant-temperature liquid supply system 1, the liquid 8 is allowed to flow from the liquid supply source 2 into the housing 3 through the inlet 4, and according to measurement results by the thermometer 12 and the above-mentioned constant temperature, the controller 40 controls operating conditions of the cooling unit 11, and applies electric power to the heater portions 32 of the first and second heaters 30 and 39 to control the liquid 8 which has flowed from the liquid supply source 2 into the housing 3 to the constant temperature. The liquid 8 of the constant temperature is thus allowed to flow out of the housing 3 toward the processing machine 100 through the outlet 5.

As described above, the heating unit 20 has the first heater 30 that heats the liquid 8 and the heater casing 21 including the space 25 that accommodates the heater portions 32 of the first heater 30 and that also allows additional accommodation of the heater portions 32 of the second heater 39. If the first heater 30 alone is insufficient to heat the liquid 8 to the above-mentioned constant temperature, the constant-temperature liquid supply system 1 according to this embodiment allows the additional arrangement of the heater portions 32 of the second heater 39 in the space 25 of the heater casing 21 with ease by attachment of the second heater 39 to the heater casing 21 after detachment of the lid body 38.

As a result, the constant-temperature liquid supply system 1 according to this embodiment, upon addition of the second heater 39, allows the second heater 39 to be added without interference with the first heater 30, and therefore exhibits an advantage that allows easy addition of a heater.

Further, the second heater 39 can be connected to the second end wall 23 of the heater casing 21 by the lid body 38 being detached from the heater casing 21, so that the second heater 39 can be additionally arranged without the liquid 8 being drained out of the heater casing 21 and the like. The constant-temperature liquid supply system 1 according to this embodiment can thus reduce the cumbersomeness associated with the additional arrangement of the second heater 39.

Furthermore, the constant-temperature liquid supply system 1 according to this embodiment also allows the second heater 39 to be arranged in the communication path 10 in which the first heater 30 has been arranged, since the second heater 39 can be connected to the second end wall 23 of the heater casing 21 by the lid body 38 being detached from the heater casing 21. Accordingly, the constant-temperature liquid supply system 1 according to this embodiment allows the additional arrangement of the second heater 39 without any expansion of the communication path 10. This can reduce temperature variations in the communication path 10, and can improve the temperature responsiveness of the liquid 8.

Figure 6:
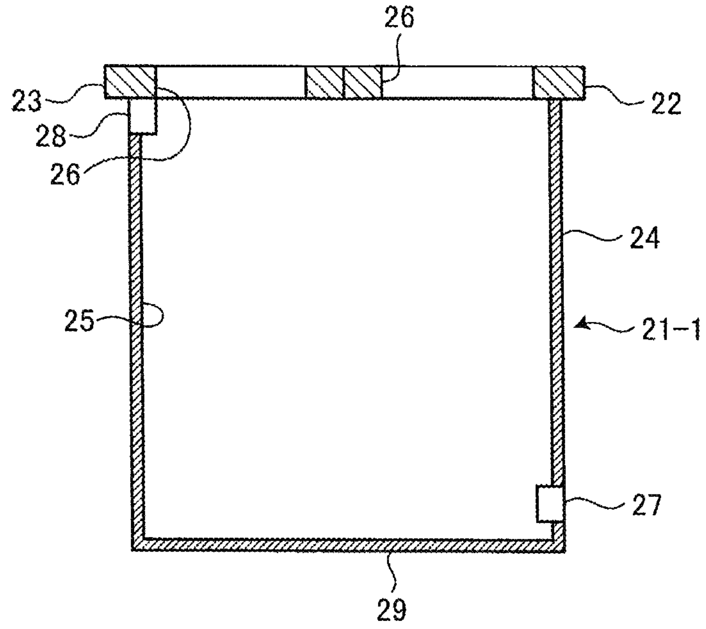
FIG. 6 is a cross-sectional view schematically depicting the configuration of a heater casing of a constant-temperature liquid supply system according to a modification of the embodiment.
Figure 7:
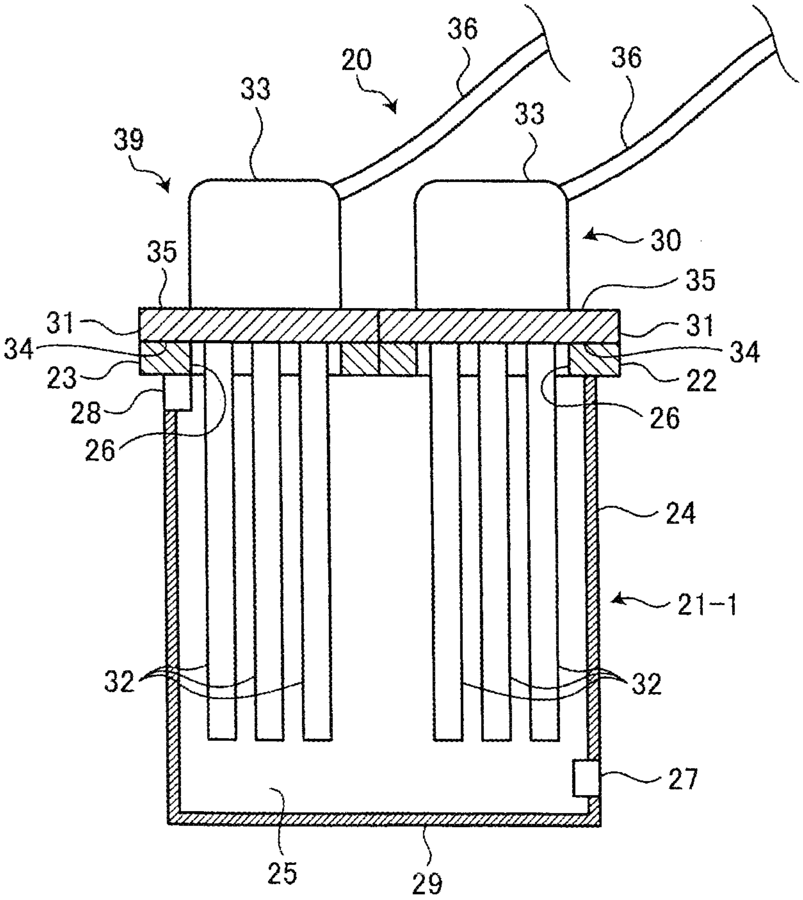
FIG. 7 is a cross-sectional view schematically depicting the heater casing depicted in FIG. 6, to which the first heater and the second heater have been attached.

A constant-temperature liquid supply system according to a modification of the embodiment will hereinafter be described in reference to FIGS. 6 and 7. FIG. 6 is a cross-sectional view schematically depicting the configuration of a heater casing 21-1 of the constant-temperature liquid supply system according to this modification of the embodiment. FIG. 7 is a cross-sectional view schematically depicting the heater casing 21-1 depicted in FIG. 6, in which the first heater 30 and the second heater 39 have been attached. In FIGS. 6 and 7, portions of this modification, the portions being the same as the corresponding portions of the embodiment, are identified by the same reference numerals, and their description is omitted.

The constant-temperature liquid supply system according to this modification is the same as that of the embodiment except that the heater casing 21-1 of the heating unit 20 is different from that of the embodiment. In the constant-temperature liquid supply system according to this modification, the heater casing 21-1 has such a configuration that, as depicted in FIG. 6, a first end wall 22 and a second end wall 23 are arranged on the same plane, one opening of a side wall 24 is closed by the first and second end walls 22 and 23, and the other opening of the side wall 24 is closed by a bottom wall 29.

As in the heating unit 20 in the embodiment, the first heater 30 is attached to the heater casing 21-1 with its flange 31 connected to the first end wall 22, for example, by undepicted bolts and nuts or the like, the second heater 39 is attached to the heater casing 21-1 with its flange 31 connected to the second end wall 23, for example, by undepicted bolts and nuts or the like, and, as depicted in FIG. 7, the heater portions 32 of the first and second heaters 30 and 39 are accommodated in a space 25 of the heater casing 21-1. The constant-temperature liquid supply system according to this modification accommodates the heater portions 32 of the first and second heaters 30 and 39 in parallel with each other in the space 25 of the heater casing 21-1.

Now, reference is also made to FIG. 5. In the constant-temperature liquid supply system according to this modification, as in the above-mentioned embodiment, the liquid 8 is allowed to flow from the liquid supply source 2 into the housing 3 through the inlet 4, and according to measurement results by the thermometer 12 and the above-mentioned constant temperature, the controller 40 controls operating conditions of the cooling unit 11, and applies electric power to the heater portions 32 of the first and second heaters 30 and 39 to control the liquid 8 which has flowed from the liquid supply source 2 into the housing 3 to the constant temperature. The liquid 8 of the constant temperature is thus allowed to flow out of the housing 3 toward the processing machine 100 through the outlet 5.

The heating unit 20 has the first heater 30 that heats the liquid 8 and the heater casing 21-1 including the space 25 that accommodates the heater portions 32 of the first heater 30 and also allows additional accommodation of the heater portions 32 of the second heater 39. As in the first embodiment, the constant-temperature liquid supply system according to this modification, upon addition of the second heater 39, hence allows to add the second heater 39 without interference with the first heater 30, and thus exhibits the advantage that allows easy addition of a heater.

The present invention should not be limited to the above-described embodiment and modification. In other words, the present invention can be practiced with various modifications within the scope not departing from the spirit of the present invention. In the present invention, the processing machine 100 is not limited to the grinding machine that subjects workpieces to grinding processing while supplying, to the workpieces, the liquid 8 of the constant temperature supplied from the constant-temperature liquid supply system 1, and may be a cutting machine that subjects a workpiece to cutting processing while supplying, to the workpiece, the liquid 8 of the constant temperature supplied from the constant-temperature liquid supply system 1.

The present invention is not limited to the details of the above-described preferred embodiment. The scope of the invention is defined by the appended claims and all changes and modifications as fall within the equivalence of the scope of the claims are therefore to be embraced by the invention.

What is claimed is:

1. A constant-temperature liquid supply system for supplying liquid from a liquid supply source to a processing machine after controlling the liquid to a constant temperature, comprising:

a housing;

an inlet disposed in the housing such that the liquid is allowed to flow from the liquid supply source into the housing;

an outlet disposed in the housing such that the liquid is allowed flow out of the housing to the processing machine;

a communication path that is enclosed in the housing and that allows communication between the inlet and the outlet; and a heating unit arranged in the communication path to heat the liquid to the constant temperature, wherein the heating unit includes:

a heater casing having a first end wall and a second end wall, a first heater that is attached to the first end wall of the heater casing and that has at least one heater portion to heat the liquid, and a disk-shaped lid body that hermetically encloses a space within the heater casing and is detachably attached to the second end wall of the heater casing, wherein the lid body is detached and removed from the second end wall and a second heater that has at least one heater portion to heat the liquid is detachably attached to the second end wall of the heater casing when the first heater alone is insufficient to heat the liquid to the constant temperature, and the space within the heater casing accommodates the at least one heater portion of the first heater, and when the second heater is detachably attached to the second end wall of the heater casing, also allows accommodation of the at least one heater portion of the second heater.

2. The constant-temperature liquid supply system according to claim 1, wherein the heater casing has the first end wall, the second end wall opposing the first end wall in a longitudinal direction of the heater casing, and a side wall, and defines the space.

3. The constant-temperature liquid supply system according to claim 2, wherein the first end wall is located lower than the second end wall.

4. The constant-temperature liquid supply system according to claim 2, wherein the heater casing has an inlet opening for the liquid, the inlet opening being disposed in the side wall on a side of the first end wall, and an outlet opening for the liquid, the outlet opening being disposed in the side wall on a side of the second end wall.

5. The constant-temperature liquid supply system according to claim 1, further comprising:

a thermometer disposed in the communication path on a downstream side of the heating unit to measure the temperature of the liquid.

* * * * *